United States Patent [19]

Coe et al.

[11] Patent Number: 5,562,756
[45] Date of Patent: Oct. 8, 1996

[54] LI-EXCHANGED LOW SILICA EMT-CONTAINING METALLOSILICATES

[75] Inventors: Charles G. Coe, Macungie; Thomas R. Gaffney; Hong-Xin Li, both of Allentown, all of Pa.; Yanliang Xiong, Heverlee, Belgium; Johan A. Martens, Huldenberg, Belgium; Pierre A. Jacobs, Gooik, Belgium

[73] Assignee: Air Products and Chemicals, Inc., Allentown, Pa.

[21] Appl. No.: 541,836

[22] Filed: Oct. 10, 1995

Related U.S. Application Data

[62] Division of Ser. No. 241,880, May 12, 1994.
[51] Int. Cl.$^6$ ............................................. B01D 53/047
[52] U.S. Cl. ........................... 95/96; 95/103; 95/130; 95/902
[58] Field of Search ................. 95/96–105, 130, 95/902

[56] References Cited

U.S. PATENT DOCUMENTS

| | | | |
|---|---|---|---|
| 3,123,441 | 3/1964 | Haden, Jr. et al. | 23/113 |
| 3,411,874 | 11/1968 | Ciric | 23/113 |
| 3,415,736 | 12/1968 | Ciric | 208/111 |
| 4,557,736 | 12/1985 | Sircar et al. | 95/97 |
| 4,859,217 | 8/1989 | Chao | 95/130 |
| 4,925,460 | 5/1990 | Coe et al. | 95/96 |
| 4,957,514 | 9/1990 | Golden et al. | 95/98 |
| 4,971,606 | 11/1990 | Sircar et al. | 95/97 |
| 5,013,334 | 5/1991 | Maurer | 95/902 X |
| 5,098,686 | 3/1992 | Delprato et al. | 423/308 |
| 5,116,590 | 5/1992 | Vaughan et al. | 423/328 |
| 5,152,813 | 10/1992 | Coe et al. | 95/130 X |
| 5,174,979 | 12/1992 | Chao et al. | 95/96 |
| 5,203,887 | 4/1993 | Toussaint | 95/96 X |
| 5,258,058 | 11/1993 | Coe et al. | 95/96 |
| 5,268,023 | 12/1993 | Kirner | 95/130 X |
| 5,413,625 | 5/1995 | Chao et al. | 95/130 X |
| 5,417,742 | 5/1995 | Tamhankar et al. | 95/96 |
| 5,417,950 | 5/1995 | Sheu et al. | 95/902 X |
| 5,464,467 | 11/1995 | Fitch et al. | 95/98 |

OTHER PUBLICATIONS

Martens, J. A. et al. "Phase Discrimination with $^{29}$Si MAS NMR in EMT/FAU Zeolite Intergrowths." *J. Phys. Chem* May 13, 1993: 5132–35.

Davis, Mark E. "Synthesis and Characterization of VPI-6, Another Intergrowth of Hexagonal and Cubic Faujasite." *Molecular Sieves* 1992: 60–69.

Lievens, J. L. et al. "Cation Site Energies in Dehydrated Hexagonal Faujasite (EMT)." *Zeolites* Jul./Aug. 1992: 698–705.

Kokotailo, G. T. and Ciric, J. "Synthesis and Structural Features of Zeolite ZSM-3." Molecular Sieve Zeolites–I, American Chemical Society 1971: 109–121.

Vaughan, D. E. W. et al. "Synthesis and Characteristics of Zeolite ZSM-20." Zeolite Synthesis, American Chemical Society 1989: 544–559.

Meier, W. M. and Olson, D. H. "FAU" and EMT. *Atlas of Zeolite Structure Types*. Butterworth–Heinemann 1992: 88–89 and 96–97.

*Primary Examiner*—Robert Spitzer
*Attorney, Agent, or Firm*—Geoffrey L. Chase

[57] ABSTRACT

The present invention is a composition, a synthesis of the composition and a method of using the composition for selectively adsorptively separating nitrogen from oxygen wherein the composition is a crystalline EMT with a Si/Al ratio less than 2.0 and a lithium cation exchange of at least 80%, preferably including an intergrowth with a crystalline FAU structure, wherein the pure or intergrowth compositions have the chemical formula:

$$(0.2\text{--}0.0)M_{2/n}O:(0.80\text{--}1.0)Li_2O:X_2O_3:(2.0 \text{ to } <4.0)SiO_2$$

wherein M=a metal cation other than lithium having a valence of n, and X is selected from the group consisting of aluminum, gallium and boron, preferably aluminum.

13 Claims, 3 Drawing Sheets

LI-EXCHANGED LOW SILICA EMT-CONTAINING METALLOSILICATES

This is a division of application Ser. No. 08/241,880 May 12, 1994.

FIELD OF THE INVENTION

The present invention is directed to the field of synthetic zeolites of the structure EMT and FAU/EMT. More specifically, the present invention is directed to an intergrowth of cubic and hexagonal FAU/EMT crystals. The synthesis of the composition and use in adsorptive separations is also demonstrated.

BACKGROUND OF THE PRIOR ART

Both natural and synthetic crystalline aluminosilicates are known and may generally be described as alumino-silicates of ordered internal structure having the following general formula:

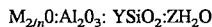

$$M_{2/n}O:Al_2O_3: YSiO_2:ZH_2O$$

where M is a cation, n is its valence, Y the moles of silica, and Z the moles of the water of hydration.

When water of hydration is removed from the crystalline aluminosilicates, highly porous crystalline bodies are formed which contain extremely large adsorption areas inside each crystal. Cavities in the crystal structure lead to internal pores and form an interconnecting network of passages. The size of the pores is substantially constant, and this property has led to the use of crystalline aluminosilicates for the separation of materials according to molecular size or shape. For this reason, the crystalline aluminosilicates have sometimes been referred to as molecular sieves.

The crystalline structure of such molecular sieves consists basically of three-dimensional frameworks of $SiO_4$ and $AlO_4$ tetrahedra. Isomorphous substitution of boron or gallium for aluminum in a zeolite framework may be achieved. The tetrahedra are cross-linked by the sharing of oxygen atoms, and the electrovalence of the tetrahedra containing aluminum is balanced by the inclusion in the crystal of a cation, e.g., alkali metal or alkaline earth metal ions or other cationic metals and various combinations thereof. These cations are generally readily replaced by conventional ion-exchange techniques.

The spaces in the crystals between the tetrahedra ordinarily are occupied by water. When the crystals are treated to remove the water, the spaces remaining are available for adsorption of other molecules of a size and shape which permits their entry into the pores of the structure.

Molecular sieves have found application in a variety of processes which include ion exchange, selective adsorption and separation of compounds having different molecular dimensions such as hydrocarbon isomers, and the catalytic conversion of organic materials, especially catalytic cracking processes.

U.S. Pat. No. 3,123,441 discloses a lithium aluminum silicate zeolite having a lithium oxide to alumina ratio of 1:1 and a silica to alumina ratio of 2:1.

U.S. Pat. No. 3,411,874 discloses the preparation of a zeolite ZSM-2 which has the chemical formula $M_{2/n}O:Al_2O_3:(3.3-4.0)SiO_2:ZH_2O$. The composition includes lithium as the M specie and is known to have utility for selective adsorption and separation of compounds, such as hydrocarbon isomers. The zeolite is synthesized from a single mixture over a period of from three days up to three months.

In U.S. Pat. No. 3,415,736, lithium-containing crystalline aluminosilicate compositions are disclosed which are broadly recited to include $(0.05-0.8)Li_2O:(0.95-0.2)Na_2O:Al_2O(2.0-6)SiO_2:(0-9)H_2O$ and, m specifically, $(0.3-0.8)Li_2O:(0.7-0.2)Na_2O$. $Al_2O_3:(2.8-4)SiO_2: (0-9)H_2O$. These zeolites are known as ZSM-3. They also are described as having utility in selective adsorptive separations, such as for hydrocarbon isomers. The crystalline ZSM-3 is recited to contain a hexagonal crystalline structure. The zeolite is typically synthesized from a combination of four solutions which form a gel from which the zeolite crystallizes over a period of hours or days.

In an article entitled, "Synthesis and Characterization of VPI-6" by Mark E. Davis, appearing in *Molecular Sieves*, (1992) pp 60–69, a crystalline zeolite having cubic and hexagonal intergrowth in the faujasite structure is disclosed. The synthesis of the zeolite involve aging a solution for 24 hours and indicates that aging is an important criteria of the synthesis. Specifically, the author of this article attempted to synthesize the zeolite in only the sodium cation form. The utility of the VPI-6 zeolite is recited to be as an adsorbent or ion exchange medium.

J. L. Lievens, et al. in an article "Cation Site Energies in Dehydrated Hexagonal Faujasite", appearing in ZEOLITES, 1992, vol. 12, July/August, pp 698–705, reviews properties of hexagonal faujasite designated as EMT. FAU/EMT intergrowths were also discerned in the studied EMT materials. Sodium was the cation which was involved in the cation site studies, and Si/Al ratios of 4.6 were specified.

U.S. Pat. No. 5,098,686 discloses faujasite compositions in which high Si/Al ratios are attempted, preferably above 3. Hexagonal and cubic structure mixtures are disclosed. All of the examples have compositions with Si/Al ratios above 3.7.

U.S. Pat. No. 5,116,590 discloses a zeolitic structure, ECR-35, which has a Si/Al ratio of 2:1 to 12:1, preferably 4. ECR-35 is an intergrowth of faujasite and Breck Structure Six (a nomenclature for hexagonal faujasite, subsequently EMT). Cation sites are occupied by tetraethylammonium and methyltriethylammonium cations.

J. A. Martens, et al. in an article entitled "Phase Discrimination with $^{29}Si$ MAS MNR in EMT/FAU Zeolite Intergrowths", J. Phys. Chem. 1993, 97, pp 5132–5135, describes the evaluation of ZSM-2 and ZSM-3 in lithium exchanged format to determine the content and extent of any EMT and FAU phases in their crystal structures.

G. T. Kokotailo, et al., reported in "Synthesis and Structural Features of Zeolite ZSM-3", Molecular Sieve Zeolites—I, Amer. Chem, Soc., 1971, pp 109–121, the synthesis of ZSM-3 with a composition of $(0.05-0.8)Li_2O:(0.2-0.95)Na_2O:Al_2O_3$: $(2-6)SiO_2:(0-9)H_2O$.

D. E. W. Vaughan, et al., in "Synthesis and Characterization of Zeolite ZSM-20", in Zeolite Synthesis, Amer. Chem. Soc. 1989, pp 545–559, investigated the effect of potassium on the ZSM-20 material which was synthesized with a template cation and reported to have hexagonal and cubic crystal structure. As reported in Table 1, potassium had an adverse impact on the formation of the ZSM-20 structure.

The prior art fails to provide a composition that is both lithium cation rich and aluminum rich which produces a cubic/hexagonal intergrowth of FAU and EMT crystalline metallosilicate having significant adsorption utility, such as air separation. The present invention as set forth below uniquely achieves these goals to provide a high performance, novel, nitrogen-selective gas separation adsorbent.

BRIEF SUMMARY OF THE INVENTION

The present invention is a crystalline metallosilicate composition comprising an EMT structure with a Si/X ratio of less than 2.0 and a lithium cation exchange of more than 80%, wherein X is selected from the group consisting of aluminum, boron and gallium.

Preferably, the EMT structure is in an intergrowth with a FAU crystal line structure.

Preferably, the intergrowth has an EMT structure content in the range of at least 5% to less than 100% by weight. More preferably, the intergrowth has at least 20% by weight of an EMT structure. More preferably, the intergrowth has at least 42% by weight of an EMT structure.

Preferably, X is aluminum.

Preferably, the cation exchange of lithium is greater than 85%. More preferably, a remaining cation is selected from the group consisting of calcium, magnesium, zinc, nickel, manganese, sodium, potassium and mixtures thereof.

Preferably, the composition is approximately 2.0 Si/Al. More preferably, the composition is approximately 1.0 Si/Al.

Preferably, the composition is prepared from at least one aged gel.

In a preferred embodiment, the present invention is a crystalline aluminosilicate composition comprising an FAU/EMT intergrowth structure with a Si/Al ratio of less than 1.4 and a lithium cation exchange of more than 80%.

The present invention is also a method of synthesizing a crystalline metallosilicate composition having an intergrowth of EMT and FAU structures, comprising; forming a first gel containing $M_{2/n}O$, $Al_2O_3$, $\geq 1.5$ $SiO_2$ in water wherein M is a metal cation, ageing the first gel at a temperature below the crystallization temperature of its constituents, forming a second gel containing $M_{2/n}O$, $Al_2O_3$, $SiO_2$ in water wherein M is a metal cation, mixing the first gel and the second gel, crystallizing the intergrowth of EMT and FAU structures and recovering it from the mixture of the first and second gels, and ion exchanging the crystallized metallosilicate composition with a source of lithium.

Preferably, lithium is ion exchanged to greater than 80%.

Preferably, the mixture of the first gel and the second gel is heated to induce crystallization.

Preferably, the source of lithium is lithium chloride.

Preferably, both gels are aged prior to mixing the gels.

Preferably, a gel is aged for a period of time in the range of 2 to 144 hours at a temperature below the crystallization of the gel's constituents.

The present invention is also a process of adsorptively separating a more strongly adsorbed gas from a less strongly adsorbed gas in a gas mixture containing a more strongly adsorbed gas and a less strongly adsorbed gas, comprising; contacting the gas mixture with a zone of adsorbent containing crystalline metallosilicate composition having an EMT structure with a Si/X ratio of less than 2.0 and a lithium cation exchange of more than 80%, wherein X is selected from the group consisting of aluminum, boron and gallium, selectively adsorbing the more strongly adsorbed gas preferentially to the less strongly adsorbed gas, removing a gas containing the less strongly adsorbed gas and depleted in the more strongly adsorbed gas from the zone and separately removing the more strongly adsorbed gas from the adsorbent.

Preferably, the zone is operated through a series of steps in a cyclical manner comprising; adsorption where the gas mixture contacts the zone at elevated pressure to adsorb the more strongly adsorbed gas until the adsorbent approaches saturation with the more strongly adsorbed gas and the gas containing the less strongly adsorbed gas and depleted in the more strongly adsorbed gas is removed as a product, discontinuing adsorption and desorbing the zone to remove adsorbed more strongly adsorbed gas from the adsorbent to regenerate the adsorbent, repressurizing the zone with a gas rich in the less strongly adsorbed gas, and repeating the series of steps to conduct a continuous process.

Preferably, the steps are conducted in a plurality of parallel connected adsorption beds as the zone wherein when one bed is conducting an adsorption step another bed is being regenerated. More preferably, the plurality of beds is two parallel connected beds.

Preferably, the more strongly adsorbed gas is nitrogen.

Preferably, the less strongly adsorbed gas is oxygen.

Preferably, the gas mixture is air.

Preferably, the adsorption is conducted at a pressure in the range of 10 to 30 psia.

Preferably, the desorption is conducted at a pressure in the range of 0.1 to 7 psia.

Preferably, the gas containing the less strongly adsorbed gas and depleted in the more strongly adsorbed gas is at least 90% oxygen by volume. More preferably, the gas containing the less strongly adsorbed gas and depleted in the more strongly adsorbed gas is at least 93% oxygen by volume.

Preferably, a remaining cation is selected from the group consisting of calcium, magnesium, zinc, nickel, manganese, sodium, potassium and mixtures thereof.

DETAILED DESCRIPTION OF THE INVENTION

Figure 1:
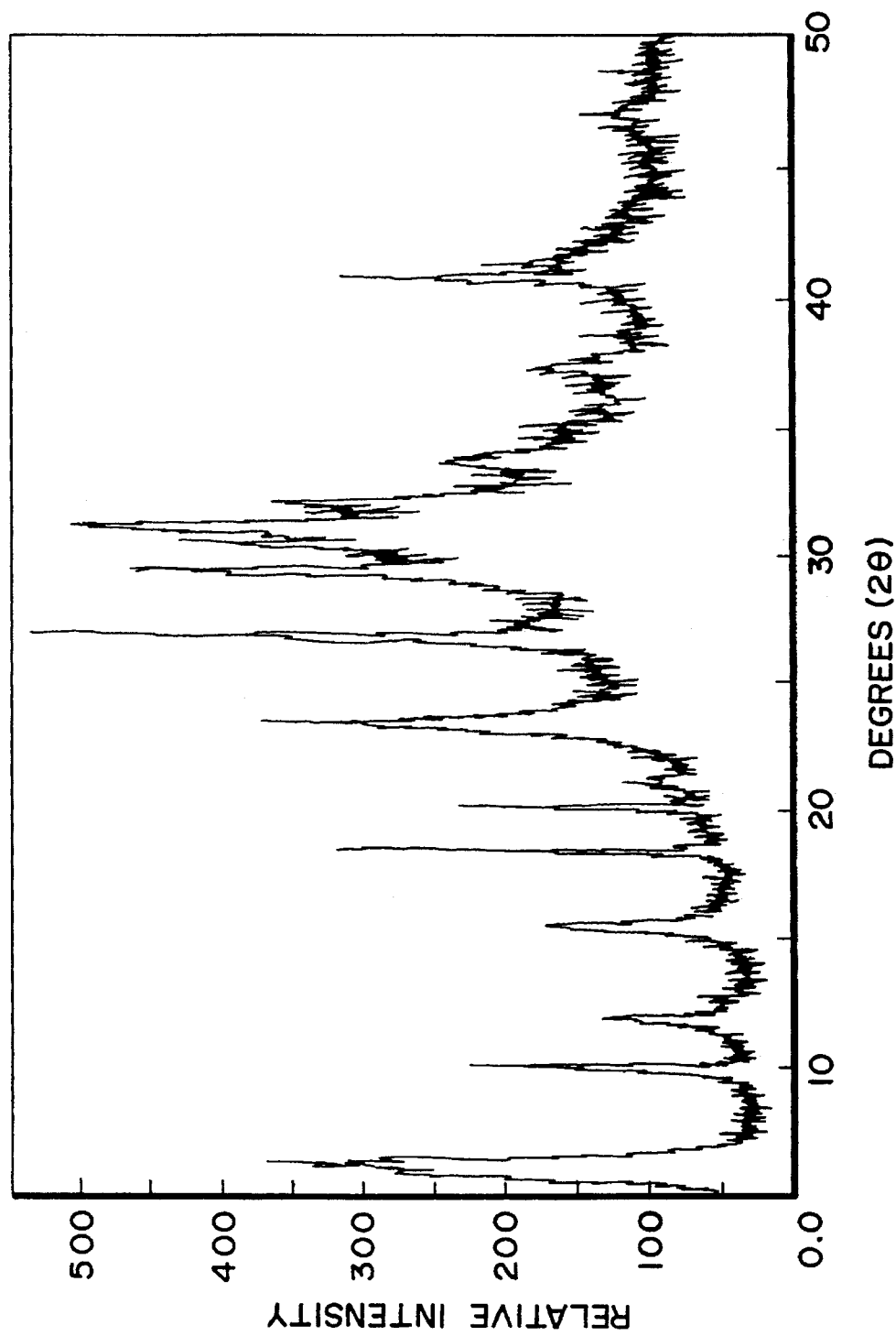
FIG. 1 is an x-ray diffraction (XRD) pattern graphing degrees (2θ) vs. relative intensity (counts) of the FAU/EMT composition of Example 1.

The present invention is directed to crystalline metallosilicate composition having an EMT structure having the chemical composition:

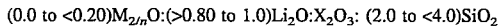

$$(0.0 \text{ to } <0.20)M_{2/n}O:(>0.80 \text{ to } 1.0)Li_2O:X_2O_3: (2.0 \text{ to } <4.0)SiO_2$$

wherein M equals a metal cation other than lithium having a valence of n and X selected from the group consisting of aluminum, gallium and boron. Preferably, the X constitutes aluminum. Preferably, the predominant cation is lithium with a remaining cation content being calcium, magnesium, zinc, nickel, manganese, sodium, potassium or mixtures thereof. Although the lithium cation exchange level can be anywhere from greater than 80 (Li/X ratio of more than 0.8) up to 100%, preferably the exchange is as high as possible, preferably a level of 85%+lithium is achieved. Although the silicon dioxide to aluminum oxide ratio is in the range of 2:1 to <4.0:1 (Si/Al=1 to <2.0), the preferred compositional ratio approximates 2.0 (Si/Al: 1).

The compositions of the present invention also include an intergrowth with a metallosilicate FAU structure and can comprise the cubic FAU structure (faujasite) intergrown with a hexagonal EMT structure (hexagonal faujasite) in a zeolitic crystal. The FAU/EMT crystalline zeolites of the present invention are a modified faujasite wherein the cubic faujasite is identified with the structure code FAU with its cubic structure and silicon dioxide to aluminum oxide ratios in the range of 2:1–4.0:1, making it a synthetic faujasite. A related structure with hexagonal symmetry is generally recognized under the code EMT. EMT and FAU are recognized zeolitic crystal structures of the Structure Commission of the International Zeolite Association, as set forth at pages 88 and 96 of the ATLAS OF ZEOLITE STRUCTURE TYPES, by W. M. Meier and D. H. Olson (1992) published by Butterworth-Heinemann on behalf of the Commission.

An important aspect in obtaining the intergrowth compositions of the present invention is the synthesis method using a combination of gels in which at least one gel has been allowed to age prior to admixture of the gels, preferably a silica-rich gel with a Si/Al>1.5, and inducing crystallization of the desired crystalline zeolite, in this case, the FAU/EMT structures. The Synthesis mixture may contain at least two cations selected from sodium, lithium, tetramethylammonium, and potassium. Alternatively, lithium exchange of the cation content of the metallosilicates of the present invention may be conducted after crystallization. Preferably, the synthesis is performed with two gels in which an aluminum-rich gel is mixed with a silicon-rich gel to produce the modified metallosilicates of the present invention.

Ageing of a gel for the purpose of this invention is the process of preparing a gel and maintaining it at a temperature below its crystallization point for sufficient time so that when it is mixed with another gel an intergrowth is ultimately formed under conditions of crystallization. Typically, the ageing period is from 2 hours up to and potentially exceeding 6 days (144 hrs.). In the process of ageing a gel, the time necessary is approximately inversely proportional to the ageing temperature.

The present invention will now be exemplified by specific examples set forth below:

Example 1. Crystallization of FAU/EMT involving the combination of two aged precursor gels.

Gel 'A' used in this preparation has a composition that is typical for the synthesis of low silica X zeolite, e.g., such as disclosed in example 18 of UK Pat. 1,580,928 (1977). It was prepared as follows. 3.33 g of NaOH (Merck) is dissolved in 3.33 g of water. 5.0 g of Al(OH)$_3$ (Merck) is added to obtain a solution of sodium aluminate. 6.23 g of 85% KOH (Merck) and 13.3 g of 50 wt. % NaOH solution are combined and added to 20 g of water. The obtained sodium and potassium solution is added to the sodium aluminate solution under stirring. A solution containing 12.2 g of water glass (Merck) and 24.4 g of H$_2$O is added. The obtained gel has a molar composition: (Na$_2$O)$_{4.34}$ (K$_2$O)$_{1.45}$ (Al$_2$O$_3$) (SiO$_2$)$_{1.8}$ (H$_2$O)$_{116}$. The gel A is aged at 40° C. for 42 hours.

Gel 'B' was synthesized according to the procedure outlined for the synthesis of ZSM-3 in Example 2, and per U.S. Pat. No. 3,415,736. It was heated during 6 h at 60° C. After this treatment, no crystalline phases are present that are detectable with XRD. One third of gel B was mixed with aged gel A, so that the OH/SiO$_2$ ratio in the mixture was 2.8. The slurry was heated to 60° C. during 24 h to provoke crystallization. The crystallization product was recovered by centrifugation at 4,000 rpm and washed until the pH of the wash water was below a value of 10. The crystallization product was a FAU/EMT intergrowth, characterized by the XRD pattern shown in FIG. 1 and the hexagonal platelet morphology found by SEM. The zeolite has a Si/Al ratio of 1.18. Phase discrimination using $^{29}$Si MAS NMR leads to conclude that the FAU/EMT intergrowth is composed of 32% of EMT phase, with Si/Al ratio of 1.21, and 68% of FAU phase, with Si/Al ratio of 1.15.

Example 2. Crystallization of FAU/EMT involving the combination of two aged gels and both inorganic and organic cations.

Gel 'A' was prepared as disclosed in Example 1 (low silica X type) and aged at 40° C. during 70 h.

Gel 'B' was prepared following a recipe that is typical for the synthesis of EMC-2, a siliceous EMT phase (M. J. Annen, D. Young, J. P. Arhancet, M. E. Davis and S. Schramm, Zeolites, 1991, 11, 98). To 26.2 g of H$_2$O are added under stirring, 2.69 g of sodium aluminate (Hopkin & Williams), 2.2 g of 50 wt. % NaOH (Merck), 2.95 g of 18-crown-6-ether (Janssen) and 6.69 g of SiO$_2$ (Riedel de Haën). The obtained gel B has a molar composition: (Na$_2$O)$_{2.4}$ (18-crown-6-ether) (Al$_2$O$_3$) (SiO$_2$)$_{10}$(H$_2$O)$_{140}$ corresponding to an OH/SiO$_2$ ratio of 0.5.

Gel B is aged at room temperature for 46 hours before mixing it with aged gel A. The final mixture has an OH/SiO$_2$ ratio of 2.5. The synthesis mixture is crystallized at 90° C. for 71 hours. The product is recovered by centrifugation at 4,000 rpm and washed till the pH of the wash water was between 9 and 10. The sample is identified by XRD as a FAU/EMT zeolite. The EMT content determined with $^{29}$Si MAS NMR amounts to 20%. The FAU and EMT parts of the crystals have a Si/Al ratio equal to 1.21.

Example 3. Synthesis of FAU/EMT involving the use of one aged gel, in presence of a mixture of an alkali metal cation (sodium) and a tetraalkylammonium cation (tetramethylammonium).

An amount of 5 g of sodium aluminate (Hopkin & Williams) and 2.4 g sodium hydroxide (Merck) are dissolved in 20.2 g water. An amount of 12.5 g of tetramethylammonium hydroxide pentahydrate (Aldrich) is added under stirring. When the solution becomes clear, 11.8 g of water glass (Merck) is added. The composition of the synthesis mixture expressed in molar ratios of oxides corresponds to: (Na$_2$O)$_{3.35}$ (TMA$_2$O)$_{1.65}$ (Al$_2$O$_3$)(SiO$_2$)$_{2.5}$ (H$_2$O)$_{95}$.

Figure 2:
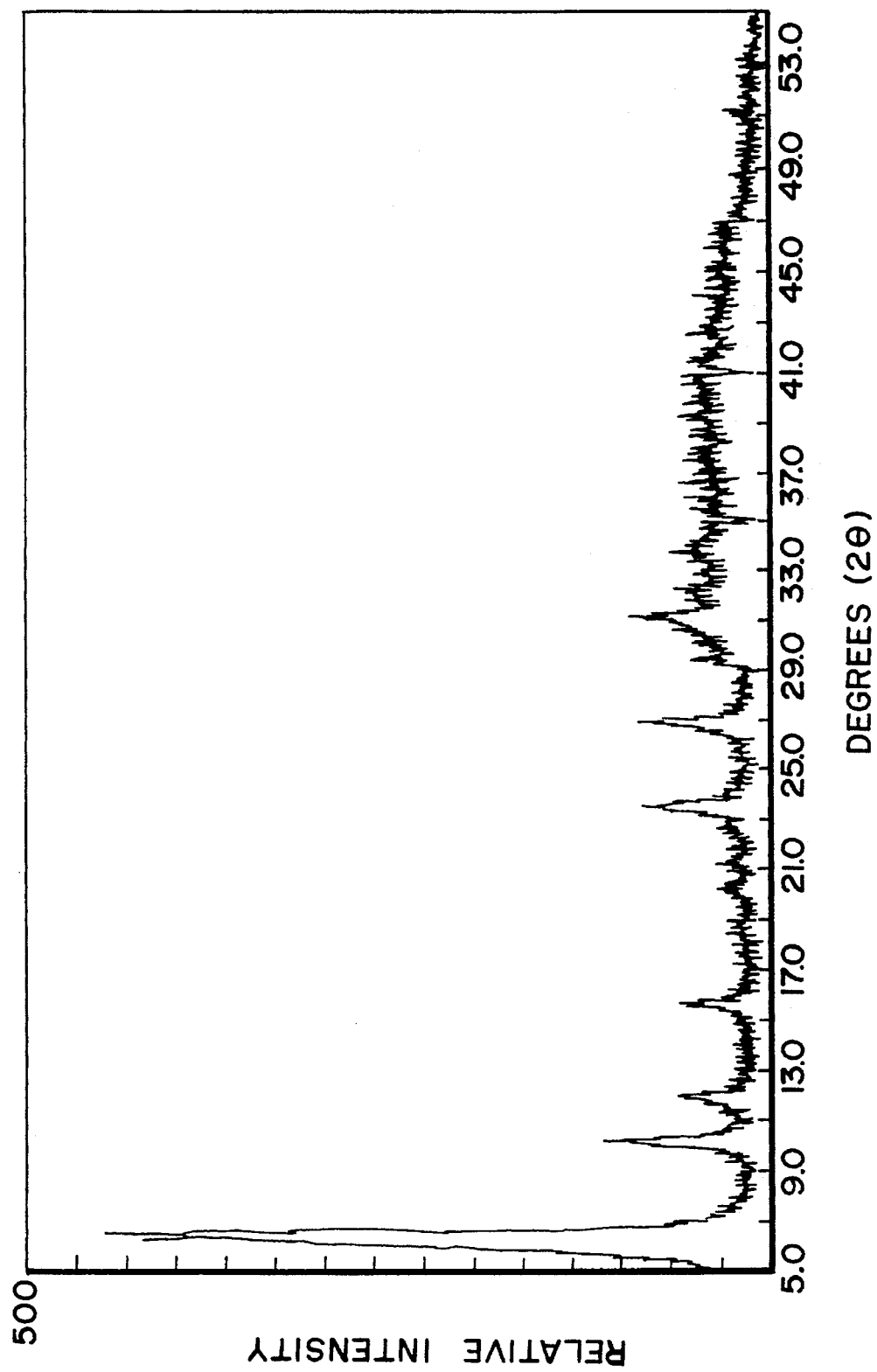
FIG. 2 is an XRD pattern graphing degrees (2θ)) vs. relative intensity (counts) of the FAU/EMT composition of Example 3.

The OH/SiO$_2$ ratio of this synthesis mixture is 4.0. The mixture is stirred during 24 h at room temperature and subsequently crystallized in a closed polypropylene bottle at 80° C. during 2 h. The product is recovered by centrifugation at 4,000 rpm and washed with distilled water until the pH of the wash water is below a value of 10. The crystallization product is identified as a FAU/EMT intergrowth, characterized by the XRD pattern shown in FIG. 2. The zeolite has a SiO$_2$/Al$_2$O$_3$ ratio of 2.1. Phase discrimination using $^{29}$Si MAS NMR, according to the method by Martens et al. (J. Phys. Chem. 1993, 97, 5132) leads to conclude that the zeolite product is composed of 32% of EMT phase, with Si/Al ratio of 1.07, and 68% of FAU phase, with Si/Al ratio of 1.04.

Example 4. Crystallization of FAU/EMT involving the combination of an aged LSX gel and a slurry of crystals of a siliceous FAU/EMT intergrowth.

Gel 'A' was prepared as described in Example 1.

The siliceous FAU/EMT crystals used as precursors in this synthesis of FAU/EMT are of the ZSM-3 type. The detailed synthesis recipe is derived from literature (J. Perez-Pariente, V. Fornes, J. A. Martens and P. A. Jacobs, Stud. Surf. Sci. Catal. 37, 1988, pp. 123–131). A crystallization directing agent (CDA) is prepared from 16.3 g of sodium hydroxide (Merck), 2.40 g sodium aluminate (Hopkin & Williams) and 32.85 g of water glass (Merck). The molar composition of the CDA is: $(Na_2O)_{26}$ $(Al_2O_3)$ $(SiO_2)_{15}$ $(H_2O)_{143}$.

The CDA is aged at 60° C. for 30 minutes before it is added to a solution containing 131.5 g of water glass (Merck) and 110 g of water. Additional aluminum is added as 18.65 g of $AlCl_3.6H_2O$ dissolved in 340 g of water. After heating the slurry at a temperature of 90° C. for 1 h, the slurry is filtered to remove the excess of sodium silicate. The filtered cake is dried at 100° C. for 3 h, and then mixed well with 100 g of water and filtered, mixed with 200 g of $H_2O$ and filtered again. 7.80 g of $LiOH:H_2O$ (Janssen) is dissolved in 6.25 g of water. The filter cake is slurried in the lithium hydroxide solution. The $OH/SiO_2$ ratio in the final synthesis mixture is 1.0. The crystallization is performed at 60° C. for 50 hours. Based on XRD, the product is identified as a FAU/EMT intergrowth. The XRD pattern is composed of a combination of broad and sharp diffraction lines, typical for ZSM-3. The Si/Al ratio of the zeolite is 1.75. Based on $^{29}Si$ MAS NMR, the FAU content is 57% with $SiO_2/Al_2O_3$ ratio of 1.64, and 43% EMT with a $SiO_2/Al_2O_3$ ratio of 1.87.

One third of the slurry of ZSM-3 crystals in their mother liquor was mixed with the aged gel A. The $OH/SiO_2$ ratio in the resulting mixture was 2.8. The slurry was heated to 80° C. during 6 h. The solid products were recovered by centrifugation at 4,000 rpm and washed until the pH of the wash water was below a value of 10. The product was essentially a FAU/EMT intergrowth, contaminated with a trace amount of gismondine, as derived from an XRD pattern. The zeolite has a Si/Al ratio of 1.3. Phase discrimination using $^{29}Si$ MAS NMR leads to conclude that the FAU/EMT intergrowth is composed of 42% of EMT phase, with Si/Al ratio of 1.35, and 58% of FAU phase, with Si/Al ratio of 1.25.

Example 5. Combination of aged gel and siliceous crystalline product.

Figure 3:
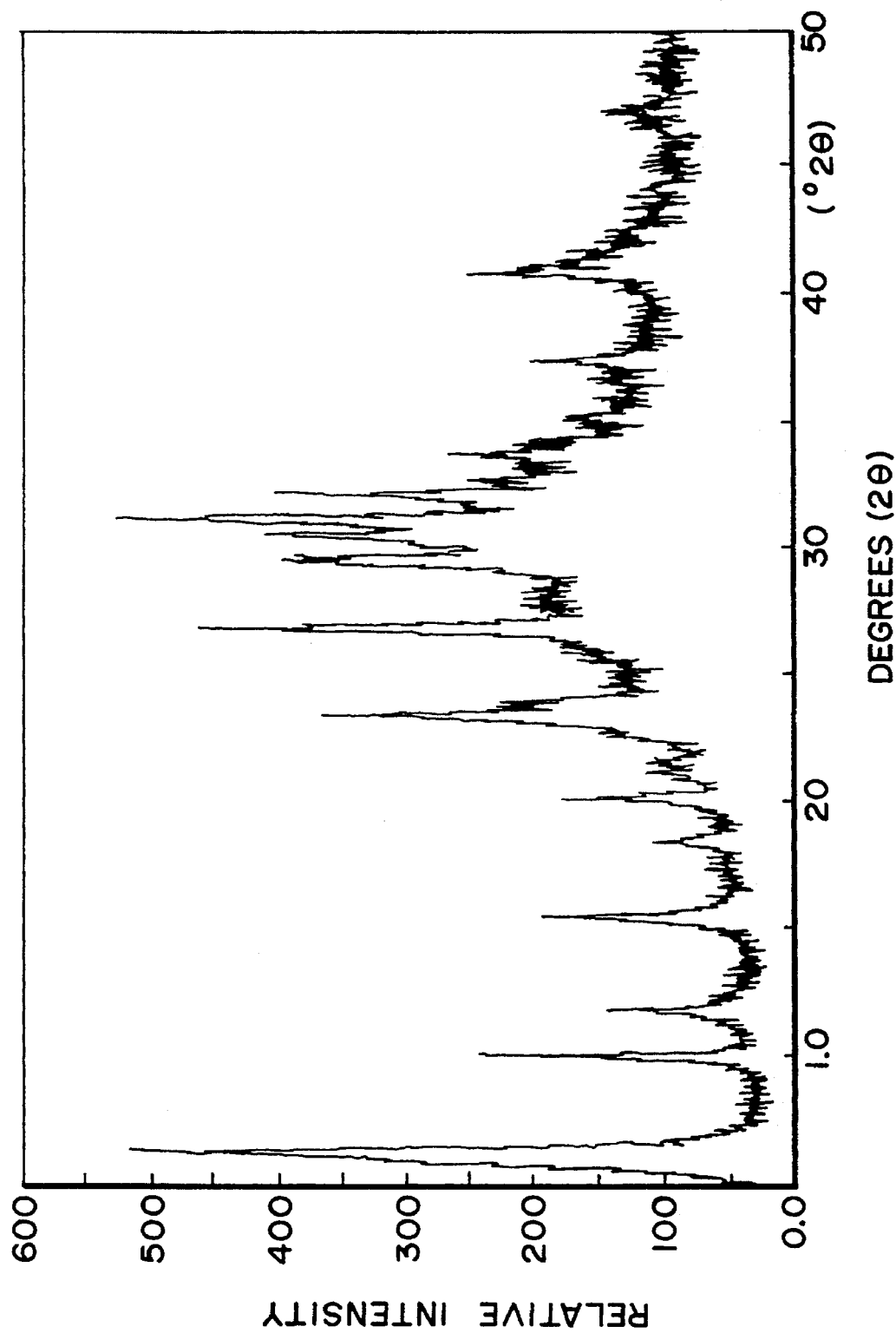
FIG. 3 is an XRD pattern graphing degrees (2θ) vs. relative intensity (counts) of the FAU/EMT composition of Example 5.

The gel 'A' and the slurry of siliceous FAU/EMT intergrowth crystals were prepared in the way and quantities explained in Example 4. The aging of gel A was performed at 40° C. for 69 h. ZSM-3 was crystallized at 60° C. for 47 h. Aged gel A and one fifth of the slurry of ZSM-3 crystals in their mother liquor were combined. The resulting mixture has an $OH/SiO_2$ ratio of 3.4. The mixture was heated at 60° C. during 6 h to provoke crystallization. The solid products were recovered by centrifugation at 4,000 rpm and washed until the pH of the wash water was below a value of 10. The product was a FAU/EMT intergrowth, characterized by the XRD pattern shown in FIG. 3 and having the typical platelet morphology consisting of clusters of submicron hexagonal platelets. The zeolite has a Si/Al ratio of 1.25. Phase discrimination using $^{29}Si$ MAS NMR leads to conclude that the FAU/EMT intergrowth is composed of 36% of EMT phase, with Si/Al ratio of 1.31, and 64% of FAU phase, with Si/Al ratio of 1.22.

Example 6. Synthesis procedure for Si/Al=1.1 material from a single aged gel.

NaOH was dissolved in deionized water (1.76 g NaOH/ 30.2 g $H_2O$). The solution was cooled to 22° C. and 5.55 g of $NaAlO_2$ (ground sodium aluminate, MCB, Lot SX274) were added and mixed for 20 minutes. The mixture was filtered and put in a polyethylene bottle outfitted with a magnetic stirrer bar. $Na_2SiO_3$ (11.68 g) (sodium silicate) was added gradually to the stirred solution. The bottle was capped and the mixture was aged for 48 hours at 22° C. with stirring. After aging, the mixture was crystallized at 80° C. for 2 hours. The product was filtered hot using a Buchner funnel and air dried. The product's XRD pattern shows it to be an FAU/EMT intergrowth.

Lithium chloride solution (50 cc of 1.0M LiCl/g zeolite) was added to the solid and heated at 95° C. for 4 hours. The mixture was filtered hot, and the solid was washed with 100 mL of deionized water. The exchange and wash procedure was repeated 5 times. After the final exchange and washing with 200 mL of deionized water, the product was filtered and air dried overnight.

Example 7. Synthesis procedure for intergrowth with Si/Al=1.4 from a single aged gel.

NaOH (6.52 g) was dissolved in 20.0 g deionized water in a 60 ml polyethylene bottle. $Al(OH)_3$ (4.40 g) was added and the mixture was stirred until a clear solution was obtained (20 minutes). N-brand silica (from PQ Corp.) (20.07 g) was added to the stirred solution, which was capped and aged with stirring for 24 hours. The mixture was then crystallized for 2 hours at 80° C. The product was filtered hot and air dried. The product's XRD pattern shows it to be an FAU/ EMT intergrowth. It was exchanged into the lithium ion form as described in Example 6.

Example 8. Crystallization of FAU/EMT involving the combination of two aged precursor gels.

The preparation of gel 'C' was based on a recipe for preparing low silica X zeolite reported in literature (G. Kuhl, Zeolites, 7 (1987) 451–457), Gel 'C' was prepared as follows. 8 g of NaOH (Merck) and 6.12 g of 85% KOH (Merck) are dissolved into 44.1 g of water. Subsequently, 4.85 g of sodium aluminate are added and the mixture stirred until a clear solution is obtained. 12.3 g of water glass are added and the mixture stirred for 10 minutes. The resulting gel 'C' has a molar composition corresponding to the following oxide ratio's: $(Na_2O)_{5.3}(K_2O)_{1.8}$ $(Al_2O_3)$ $(SiO_2)_{2.2}$ $(H_2O)_{1.22}$.

The $OH/SiO_2$ ratio in gel 'C' is 6.3. Gel 'B' was prepared as explained in Example 2 and heated at 60° C. for 6 hours. One fourth of gel 'B' was mixed with gel 'C'. The $OH/SiO_2$ ratio was 3.0. This final mixture was crystallized at 60° C. for 24 hours. The product was recovered by centrifugation at 4,000 rpm and washing until the pH of the wash water was below a value of 10. The product was dried at 60° C. The product is identified by XRD as a FAU/EMT intergrowth.

Example 9 Synthesis of FAU/EMT Intergrowth with Si/Al=1.17 with Two Aged Gels.

Synthesis of FAU/EMT intergrowths involved two gels with different Si/Al ratios.

Gel '1' was prepared as follows. 12.78 g of NaOH solution (50 wt. %) was mixed with 49.2 g of deionized water. 6.66 g of $Al(OH)_3$ powder (J. T. Baker) was added to form a sodium aluminate solution. 50.0 g of colloidal silica (Ludox HS40, Dupont) was mixed into the above solution. The mixture was stirred at room temperature for 46 hours.

The obtained gel '1' has the following molar composition: $Na_2O:Al_2O_3:10SiO_2:140H_2O$.

Gel '2' was prepared as follows. 11.46 g of NaOH (97 wt. %) was dissolved in 50.0 g of deionized water. 6.0 g of $Al(OH)_3$ powder (J. T. Baker) was added to form a sodium aluminate solution. 6.93 g of KOH (87.4 wt. %) was dissolved into the above solution. Then, 13.8 g of sodium silicate (PQ "N" brand) was added to form a gel. The gel was aged at room temperature for 20 hours. The obtained gel '2' has the following molar composition: $5.3\ Na_2O:1.8\ K_2O:Al_2O_3:2.2\ SiO_2:122\ H_2O$.

Gel '2' was combined with ⅛ of gel '1' to form a mixture. The mixture was heated at 60° C. for 70 hours. The formed product was filtered and washed. The crystalline product has an FAU/EMT intergrowth structure, characterized by its XRD pattern. Chemical analysis shows that the zeolite has a Si/Al ratio of 1.17. Example 9 shows that an FAU/EMT intergrowth can be synthesized without a template, crystallization directing agent or a cation other than sodium and/or potassium.

Example 10.

The compositions from Examples 1 to 5 were exchanged into the lithium form using five static batch exchanges with 50 cc 2M LiCl/g at 100° C. In all cases over 854 Li exchange was achieved.

Table 1 summarizes the characterization data and $N_2$ adsorption at 23° C., i arm for the compositions described in Examples 1 to 7 and compares it to a LiX control. All the samples have at least 20% EMT present. The data clearly shows that the $N_2$ capacity is not adversely affected by the presence of EMT and in Examples 1, 2, and 5 display $N_2$ capacities similar to LiX not having EMT present at all.

TABLE 1

Characterization and nitrogen adsorption for Li-exchanged FAU/EMT intergrowths.

| Example | $Si/Al)_F$ | EMT Content (%) | Micropore Vol (cc/g) | $N_2$ Capacity 23° C., 1 atm (cc/g) |
|---|---|---|---|---|
| 1 | 1.20 | 32 | 0.30 | 21.8[b] |
| 2 | 1.20 | 20 | 0.30 | 23.6[b] |
| 3 | 1.06 | 32 | 0.27 | 16.7[b] |
| 4 | 1.30 | 42 | 0.24 | 11.3[b] |
| 5 | 1.25 | 36 | 0.30 | 20.2[b] |
| 6 | N/A 1.1[a] | 25 | 0.25 | 11.1 |
| 7 | N/A 1.4[a] | 32 | N/A | 11.5 |
| LiX Control | 1.20 | 0 | 0.33 | 21.3 |

N/A) not available
[a]) from bulk elemental analysis
[b]) measured at 20° C., 1 atm Example 11. Predicted performance for $O_2$ VSA.

In order to evaluate the potential of the adsorbents of this invention for air separation, nitrogen and oxygen isotherms were measured for the material from 0 to 8 atm at 23° C. and 45° C. The data was then used in a global equilibrium model (GEM) which is routinely used as an indicator of relative performance in adsorbent screening. This model is similar to "Flash" calculations in distillation (e.g., W. L. McCabe, and J. C. Smith, "Unit Operations in Chemical Engineering", 3rd edition, McGraw Hill, New York (1976), p. 534). A key assumption in the model is that the mass transfer zones remain extremely narrow in each step of the process; i.e., zone-spreading due to mass-transfer resistances and iso-therm-shape are taken to be negligible. As a first approximation, this is a reasonable assumption in the case of equilibrium-based separation processes. The omission of zone-spreading causes the model-predictions to be, in general, over estimated but, the model has been found to be good for relative performance-ranking. It is pertinent to note that the model satisfies mass and energy balances, and calculates mixture adsorption using the Ideal Adsorbed Solution (IAS) theory (A. L. Meyers and J. M. Prausnitz, American Institute of Chemical Engineers Journal, 11, 121 (1965) which is accepted for physical adsorption of air on zeolites at ambient temperatures (G. W. Miller, K. S. Knaebel, and K. G. Ikels, "Equilibria of Nitrogen, Oxygen, Argon and Air in Molecular Sieve 5A" American Institute of Chemical Engineers Journal, 33, 194 (1987); and Srinivasan, R., Auvil, S. R., and Coe, C. G., "Tracer Pulse Chromatography for Measuring Equilibrium Adsorption in Air-Zeolite Systems", China-Japan-USA Symposium on Advanced Adsorption Science and Technology-Extended Abstracts, Zhejiang University Press, China (1988)).

Table 2 below presents the gas capacities and predicted performance from the GEM model. Using the global equilibrium model the $O_2$ recovery and quantity of adsorbent required to produce a pound mole of $O_2$ product per cycle (bed sizing factor) were calculated for a typical $O_2$ VSA process. We compared lithium X with the adsorbents described in Examples 1, 2, and 5 and found them to have similar properties.

TABLE 2

Predicted $O_2$ VSA Performance

| Example | Gas Capacity (cc/g at 23° C., 1 atm) | | Predicted $O_2$ Recovery (%) | Bed Size Factor ($\times 10^3$) |
|---|---|---|---|---|
| | $N_2$ | $O_2$ | | |
| 1 | 18.6 | 3.8 | 62.6 | 14.2 |
| 2 | 25.6 | 4.7 | 63.3 | 12.6 |
| 5 | 16.4 | 3.4 | 61.0 | 16.5 |
| LiX (1.2) | 23.6 | 4.7 | 62.4 | 13.7 |

The results clearly show there is a utility for these adsorbents as air separating agents.

The chemical composition of FAU/EMT zeolites, in their dehydrated state corresponds to the following mole ratio of oxides: $T_2O:X_2O_3:(2.0–4.0)SiO_2$ in which T represents at least two cations selected from $Li^+$, $Na^+$, tetramethylammonium, and optionally in addition $K^+$. X is aluminum, gallium, boron or another trivalent element.

The synthesis of FAU/EMT zeolites can be performed from synthesis mixtures with ratio's of reactants within the following ranges:

| | broad range | preferred range |
|---|---|---|
| $OH/SiO_2$ | 1.0 to 6.0 | 1.5 to 4.0 |
| $SiO_2/X_2O_3$ | 2.0 to 6.0 | 3.0 to 4.6 |
| $T_2O/SiO_2$ | 0.5 to 3.0 | 0.75 to 2.0 |
| $H_2O/SiO_2$ | 15 to 100 | 20 to 50 |

The silica source may be aqueous sodium silicate solution, colloidal silica, particulate silica, fumed silica and the like. Sources of aluminum are sodium aluminate, aluminum sulfate, aluminum chloride, aluminum nitrate. Lithium, sodium, potassium and tetraalkylammonium cations are introduced as hydroxides or salts.

There are three synthetic procedures for preparing the metallosilicates of the present invention. In all procedures, an available recipe leading to a FAU, EMT or FAU/EMT material is modified to enhance EMT formation. All recipes have in common that the synthesis mixture contains at least two monovalent cations, most preferably selected from the group of $Na^+$, $Li^+$, tetramethylammonium and optionally, in addition K+.

The first procedure consists of modifying a synthesis gel that otherwise leads to a FAU-rich and Al-rich zeolite (eventually contaminated with other zeolite phases such as LTA type) by adding foreign monovalent alkali metals or quaternary alkylammonium cations, as demonstrated in Example 3.

The second procedure consists of mixing two preaged gels. A first gel leading to an Al-rich FAU-rich phase, when crystallized separately (eventually contaminated with other zeolite phases such as LTA type), and a second aged gel leading to a Si-rich EMT-rich zeolite when crystallized separately (e.g., ZSM-3, EMC-2), as demonstrated in Examples 1 and 2.

The third procedure consists of mixing a slurry of siliceous FAU/EMT intergrowth zeolite in its mother liquor with a preaged gel leading to an Al-rich FAU-rich phase, when crystallized separately (eventually contaminated with other zeolite phases such as LTA type), as demonstrated in Example 4.

Below are some comparative examples provided in support of the claimed distinctions over prior art compositions or methods.

Control 1: Synthesis using one aged gel, in presence of a mixture of sodium and potassium.

The gel typically used for the synthesis of Al-rich FAU zeolite, prepared in Example 1 and having a composition: $(Na_2O)_{4.34}$ $(K_2O)_{1.45}$ $(Al_2O_3)$ $(SiO_2)_{1.8}$ $(H_2O)_{116}$ corresponding to an $OH/SiO_2$ ratio of 6.6 was aged 40° C. for 47 hours and crystallized at 60° C. for 23 hours. The zeolite is separated from the mother liquor by centrifugation at 4,000 rpm, washing and drying.

The product is a mixture of FAU and LTA zeolite types.

Control 2: Synthesis of low silica X.

A gel was prepared as explained for gel 'C' of Example 8. To 44.1 g of water, 8 g of sodium hydroxide (Merck) and 6.12 g of 85% potassium hydroxide (Merck) were added and dissolved. Subsequently, 4.85 g of sodium aluminate (Riedel de Haën) were added and dissolved until a clear solution was obtained. 12.3 g of water glass (Merck) were added and the mixture stirred for 10 minutes. The gel has a molar composition: $(Na_2O)_{5.3}$ $(K_2O)_{1.8}$ $(Al_2O_3)$ $(SiO_2)_{2.2}$ $(H_2O)_{122}$. It was crystallized at 60° C. for 24 hours. The zeolite is separated from the mother liquor by centrifugation at 4,000 rpm, washing and drying. The product is a pure FAU type of phase.

Control 3: Synthesis of zeolite X.

An amount of 5 g of sodium aluminate and 3.15 g of sodium hydroxide (Merck) are dissolved in 39 g of water. A solution composed of 18 g water glass (Merck) and 26 g water was added. The gel has a molar composition: $(Na_2O)_{3.6}$ $(Al_2O_3)$ $(SiO_2)_{3.0}$ $(H_2O)_{144}$. It was stirred at room temperature overnight and crystallized at 60° C. for 23 hours. The product was recovered by centrifugation at 4,000 rpm, washing and drying. It is identified as pure zeolite X.

The present invention has been set forth with regard to a number of specific examples. However, the full scope of the invention should be ascertained from the claims which follow.

We claim:

1. A process of adsorptively separating a more strongly adsorbed gas from a less strongly adsorbed gas in a gas mixture containing a more strongly adsorbed gas and a less strongly adsorbed gas, comprising; contacting said gas mixture with a zone of adsorbent containing crystalline metallosilicate composition having an EMT structure with a Si/X ratio of less than 2.0 and a lithium cation exchange of more than 80%, wherein X is selected from the group consisting of aluminum, boron and gallium, selectively adsorbing said more strongly adsorbed gas preferentially to said less strongly adsorbed gas, removing a gas containing said less strongly adsorbed gas and depleted in said more strongly adsorbed gas from said zone and separately removing said more strongly adsorbed gas from said adsorbent.

2. The process of claim 1 wherein said EMT structure is in an intergrowth with a FAU crystalline structure.

3. The process of claim 1 wherein said zone is operated through a series of steps in a cyclical manner comprising; adsorption where said gas mixture contacts said zone at elevated pressure to adsorb said more strongly adsorbed gas until said adsorbent approaches saturation with said more strongly adsorbed gas and said gas containing said less strongly adsorbed gas and depleted in said more strongly adsorbed gas is removed as a product, discontinuing adsorption and desorbing said zone to remove adsorbed more strongly adsorbed gas from said adsorbent to regenerate said adsorbent, repressurizing said zone with a gas rich in said less strongly adsorbed gas, and repeating said series of steps to conduct a continuous process.

4. The process of claim 3 wherein said steps are conducted in a plurality of parallel connected adsorption beds as said zone wherein when one bed is conducting said adsorption another bed is being regenerated.

5. The process of claim 4 wherein said plurality of beds is two parallel connected beds.

6. The process of claim 1 where said more strongly adsorbed gas is nitrogen.

7. The process of claim 6 where said less strongly adsorbed gas is oxygen.

8. The process of claim 7 where said gas mixture is air.

9. The process of claim 8 wherein said gas containing said less strongly adsorbed gas and depleted in said more strongly adsorbed gas is at least 90% oxygen by volume.

10. The process of claim 9 wherein said gas containing said less strongly adsorbed gas and depleted in said more strongly adsorbed gas is at least 93% oxygen by volume.

11. The process of claim 1 wherein said contacting is conducted at a pressure in the range of 10 to 30 psia.

12. The process of claim 1 wherein said separately removing is conducted at a pressure in the range of 0.1 to 7 psia.

13. The process of claim 1 wherein in said crystalline metallosilicate composition a remaining cation is selected from the group consisting of calcium, magnesium, zinc, nickel, manganese, sodium, potassium and mixtures thereof.

\* \* \* \* \*